(12) United States Patent
Rao et al.

(10) Patent No.: US 6,633,411 B1
(45) Date of Patent: Oct. 14, 2003

(54) METHOD AND APPARATUS FOR REPURPOSING BINARY IMAGES

(75) Inventors: Ravishankar Rao, White Plains, NY (US); Frederick Cole Mintzer, Shrub Oak, NY (US); Gerhard Robert Thompson, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/110,900

(22) Filed: Jul. 6, 1998

Related U.S. Application Data
(60) Provisional application No. 60/080,369, filed on Apr. 1, 1998.

(51) Int. Cl.[7] .................. H04N 1/405; H04N 1/409; G06T 5/40
(52) U.S. Cl. ............ 358/2.1; 358/3.07; 358/3.08; 358/3.27; 382/173; 382/176; 382/171
(58) Field of Search .................. 382/237, 176, 382/171, 173, 199, 270, 266; 358/1.9, 298, 462, 456, 458, 466, 2.1, 3.06, 3.07, 3.08, 3.27

(56) References Cited

U.S. PATENT DOCUMENTS

| | | | | |
|---|---|---|---|---|
| 5,229,867 A | * | 7/1993 | Ershov et al. | 382/237 |
| 5,323,247 A | * | 6/1994 | Parker et al. | 358/456 |
| 5,477,305 A | * | 12/1995 | Parker et al. | 358/455 |
| 5,587,808 A | * | 12/1996 | Hagihara et al. | 358/462 |
| 5,832,141 A | * | 11/1998 | Ishida et al. | 358/462 |
| 5,852,678 A | * | 12/1998 | Shiau et al. | 358/1.9 |
| 5,974,197 A | * | 10/1999 | Lee et al. | 382/109 |
| 5,995,658 A | * | 11/1999 | Hanyu | 382/176 |

OTHER PUBLICATIONS
William H. Press, et al., *Numerical Recipes in C*, "Fourier Transform Spectral Methods", Cambridge University Press, 1988, 406–412.
Dana H. Ballard, et al., *Computer Vision*, "Region Growing", Prentice–Hall, Inc., 1982, 149–151.
Walter Vandaele, *Applied Time Series and Box–Jenkins Models*, Academic Press, Inc., (1983) 12–13, 124–131.
Lawrence G. Tatum, "Control Charts for the Detection of a Periodic Component", *Technometrics*, 1996, 38:2.

* cited by examiner

*Primary Examiner*—Scott Rogers
(74) *Attorney, Agent, or Firm*—Scully, Scott, Murphy & Presser; Louis P. Herzberg

(57) ABSTRACT

A method, computer program product, and a program storage device readable by machine, for repurposing images includes classifying the pixels of a binary image as being either halftone image pixels or non-halftone image pixels, further processing the halftoned image pixels with halftone image pixel processing and combining the outputs of the halftone image pixel processing and non-halftone image pixel processing to prepare the images for a second purpose such as a second printer. The processing that classifies the binary pixels as being either halftone image pixels or non-halftone image pixels segments the image into regions of halftone image pixels and regions of non-halftone image pixels. The processing of regions of halftone image pixels first constructs an intermediate gray scale representation of the regions of halftone image pixels. The processing to construct the gray scale representation of the region of halftone image pixels estimates the primary periodicity of the values of the binary pixels within the region of halftone image pixels. The intermediate gray scale image is rehalftoned and combined with the non-halftone image to form the repurposed image.

21 Claims, 11 Drawing Sheets

METHOD AND APPARATUS FOR REPURPOSING BINARY IMAGES

CROSS REFERENCE TO RELATED APPLICATION

This application claims priority from U.S. Provisional application 60/080,369 filed Apr. 1, 1998.

FIELD OF THE INVENTION

The present invention pertains to the field of digital printing and imaging, and is specifically directed to the reproduction of digitized documents.

BACKGROUND OF THE INVENTION

With the growing use of digital input means such as digital scanners and cameras, and digital printers, users will demand more flexibility in their choice of input and output devices. Thus it becomes important to be able to repurpose documents and images automatically and efficiently. The term repurpose is defined as follows. Any multimedia object such as text, images, audio and video is created with a specific purpose in mind, i.e. a target audience and conditions under which the object is consumed by the audience. By repurposing, we mean processing the multimedia object so that it serves a different purpose, i.e a different target audience and conditions governing the use of the object. For instance, a newspaper agency would like to format text and images for printing in a newspaper, and take the same content and repurpose it for on-line viewing on the Web. If a better printer becomes available, a user will be interested in taking pictures scanned and formatted for an original printer and printing them on an improved printer. Since the original scanned document or object is invariably not available, it is crucial for this repurposing to be done automatically from the available halftone.

With the growing use of multimedia objects as well as the increasing number of choices for output media, such as different printers and monitors, it is very hard to anticipate all the uses of an object at the time of creation, and it is also difficult to repurpose the object as it may involve very complex processing steps.

An instance of this problem is to take a halftoned image prepared for one printer, and process it such that when it is halftoned and printed on a second printer, the outputs of the two printers are visually as similar as possible. This problem is known as "descreening" or "inverse halftoning" in the literature.

A bi-level composite document containing both text and image areas, is comprised of a collection of individual pixels, each of which has only two values. These values could be "1" or a "0", with "1" signifying black, such as a printed dot, and "0" signifying white. Currently, there is no satisfactory solution to repurposing this document for another printer. Some of the obstacles in solving this problem are as follows:

1. Image and text areas need to be treated differently by a printer. Typically, image areas are halftoned with a repetitive screen, whereas text areas are not halftoned. The reason for this is that it is desirable for text to be printed with sharp edges.

2. Due to the above mentioned dichotomy in text and image areas, a composite document containing both text and images needs to be segmented into regions containing only text and only images. This segmentation process needs to be done accurately.

3. If a halftoned image prepared for one printer is printed on a second printer, there is a possibility of introducing Moire artifacts (interference fringes), which is a well known phenomenon. This shows up as an undesirable print quality problem.

SUMMARY OF THE INVENTION

In accordance with the method of the present invention, the first processing step is to segment a composite document into image and text areas. The text areas are left alone, to be combined at a later stage. The image areas are analyzed to determine their periodic screen frequency, and a smoothing filter is dynamically designed to eliminate the appearance of the screen (i.e. perform descreening). The descreened image is then re-halftoned while taking into consideration the characteristics of the second printer.

There are several potential uses for the method of the present invention:

1. An original halftone prepared for one printer can be printed on another printer without loss of quality and the introduction of artifacts.

2. This technique can also be used to perform image enhancement tasks. For instance, if the original halftoned image had poor contrast, we re-create an intermediate gray level representation, enhance the contrast, and then re-halftone the enhanced image. We can also add some random noise to improve the appearance of texture in the textured areas of the image.

DETAILED DESCRIPTION OF THE INVENTION

Figure 1:
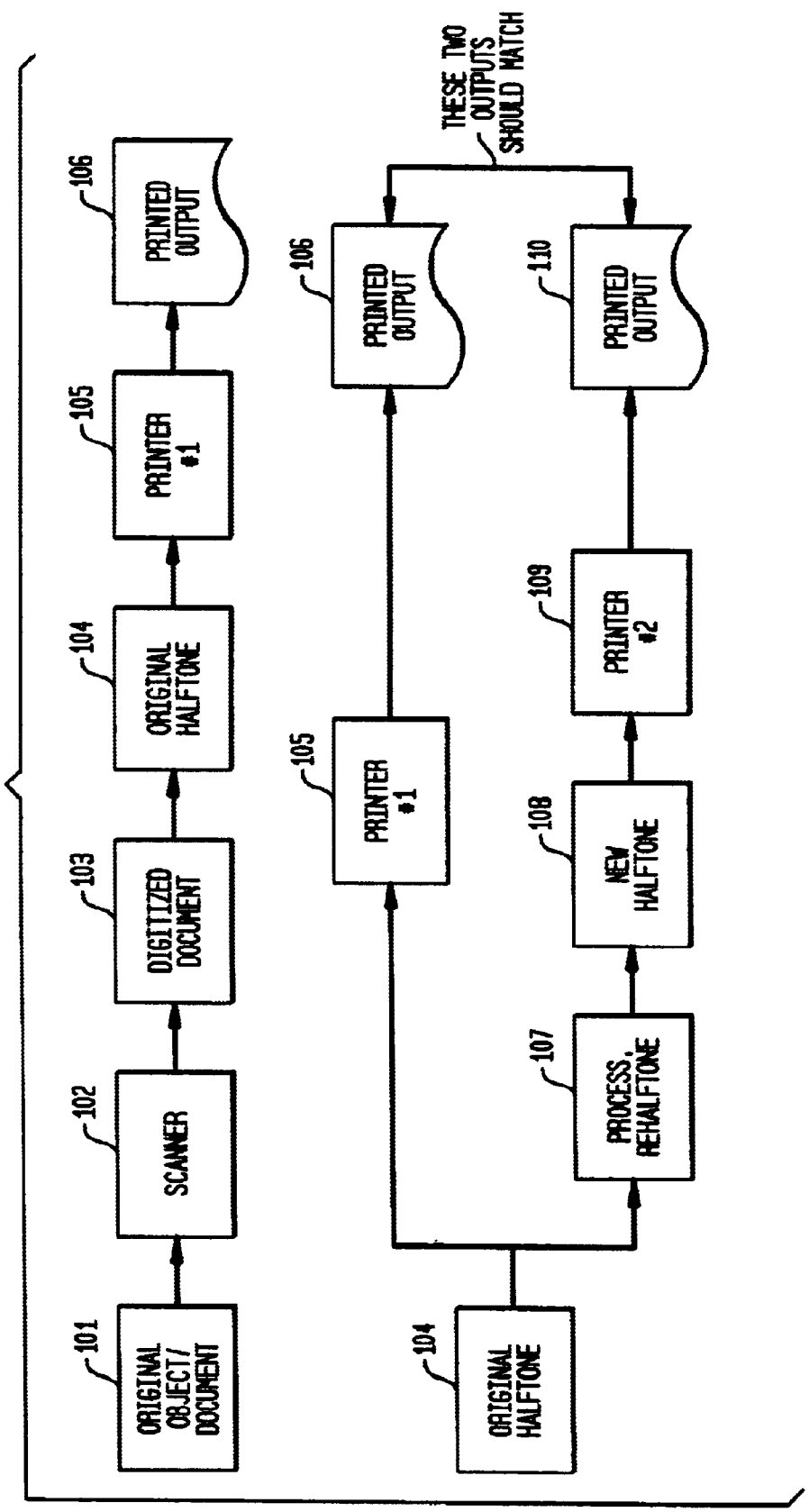
FIG. 1 is a block diagram showing one example of an application of the present invention.
Figure 2:
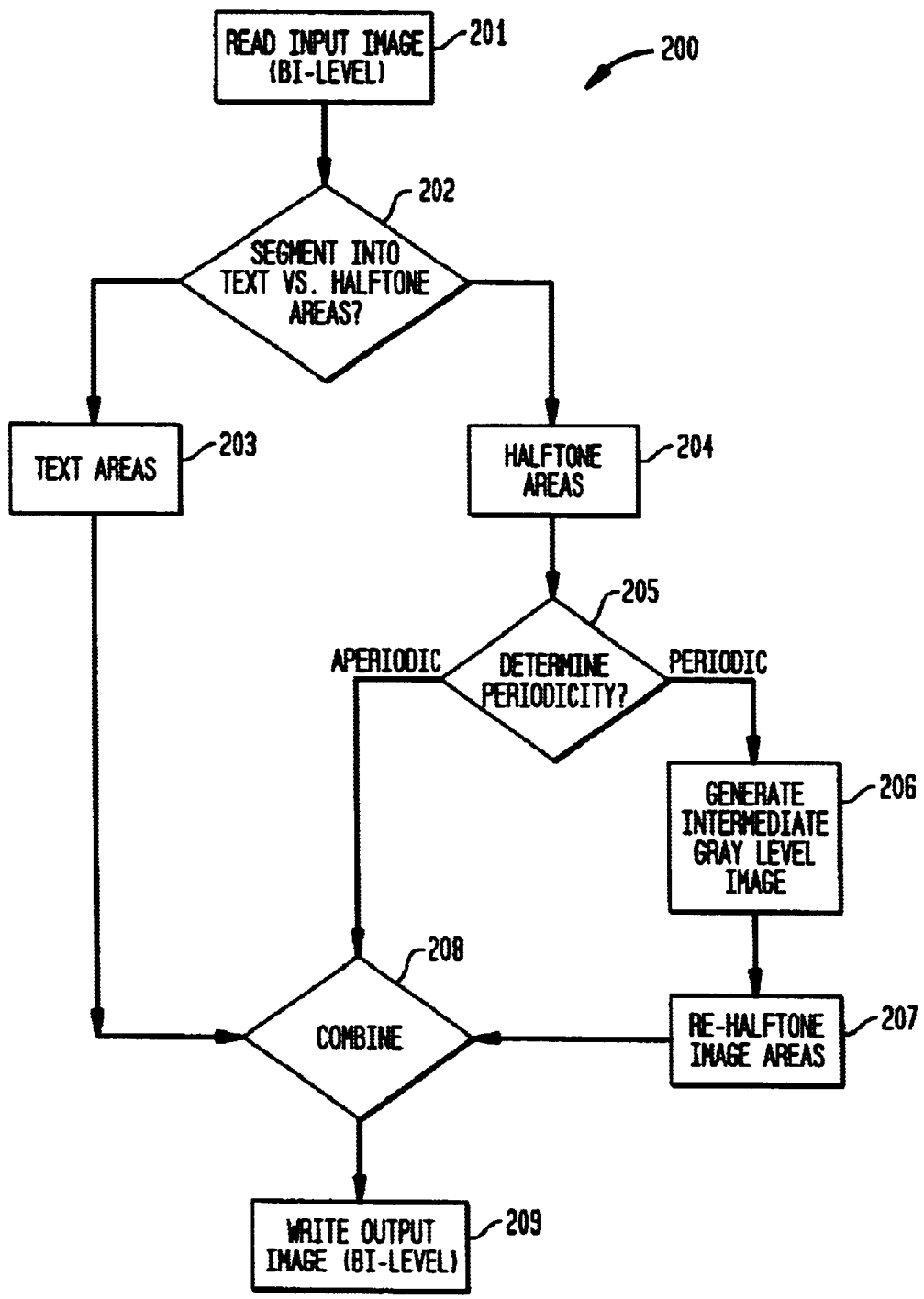
FIG. 2 is a flow chart of the overall method of the present invention.

FIG. 2 is a high-level description of the present invention. The input 201 to the system 200 is a bi-level image, containing one pixel per bit, where a "1" signifies that a dot is printed and a "0" signifies no dot is printed. The input image is first segmented 202 into halftone 204 and text 203 areas. The halftone areas 204 are then analyzed 205 to determine their periodicity. The periodic halftones are converted to an intermediate gray level representation 206 which is then re-halftoned 207. By re-halftoning, it means taking the gray level representation and halftoning it using well known techniques such as dither matrices or error-diffusion. The re-halftoned image areas are combined 208 with the non-periodic image areas and text areas to generate the final bi-level image 209.

Segmentation into Text and Halftone areas

Given a set of N labels $L=\{l_1, l_2, \ldots l_N\}$. the objective of segmentation is to assign a unique label $l_1$ to every pixel in the image. In an illustrative embodiment two labels are used, $l_1=1$ meaning the pixel belongs to a halftone neighborhood and $l_2=0$ meaning the pixel belongs to a non-halftone neighborhood, which could be text or background. Thus the result of segmentation is a binary image where a pixel is assigned a label of "1" or "0". The reason we wish to perform this segmentation is that text areas are better processed separately because text would lose its sharpness if halftoned.

Instead of making this assignment at every pixel in the original image, one can make it at every $P^{th}$ pixel, where P is the sampling factor. For instance, the assignment can be made at every $10^{th}$ pixel, thereby reducing the number of computations significantly.

Thus, the result is an initial coarse segmentation, where a label is assigned to every $P^{th}$ pixel. In order to extend the label assignment to every pixel in the original image, a clustering technique, described below is employed. (Note: P can be trivially set to 1, which results in the clustering step becoming redundant. However, this is computationally more expensive).

Initial Segmentation Based on Gradient Activity

In accordance with the present invention, a segmentation technique based on gradient information is used. Prior art methods for segmentation use contrast information. However, the method using contrast is applicable only when the image is scanned as a gray-level image. This is because the contrast measure examines the difference in intensity values between the text characters and the background, which will be high. It is not likely that such high contrast exists in the image areas. However, the present problem is different as there is a bi-level image: the difference in intensity between text characters and the background can be either 1 or –1, and this value can just as well occur in the image areas. Thus contrast will not provide a mechanism to segment the image. Hence, the gradient-based technique of the present invention is needed.

Figure 3:
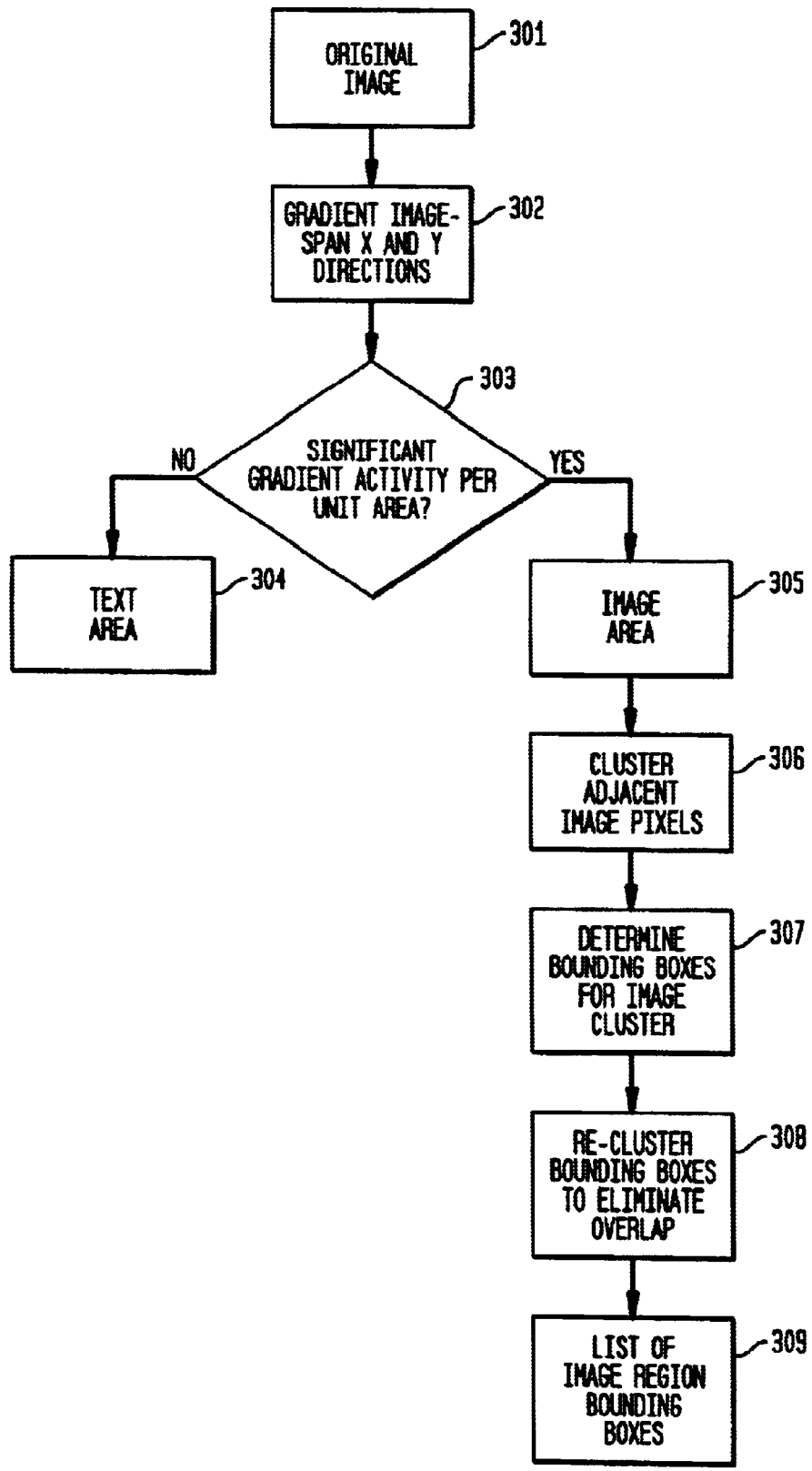
FIG. 3 is a flow chart of the halftone-nonhalftone segmentation portion of the method of the present invention.

FIG. 3 describes the procedure used to segment the halftone areas from the text areas from an original image 301. The segmentation is facilitated by the observation that halftone areas contain more transitions between black and white values than text areas. Since gradients 302 measure transitions, a simple measure to consider is the gradient activity per unit area 303. This measure is defined as follows. Let I denote the bi-level image, having U rows and V columns. Let I(i,j) represent the image intensity of a pixel at spatial coordinate (i,j) where i and j are the indices along the x and y directions. Since I is bi-level, I(i,j) is either 0 or 1. The image gradient at a pixel with spatial coordinates (i,j) is a two dimensional vector G(i,j) having x and y components $G_x(i,j)$ and $G_y(i,j)$ respectively.
$G_x(i,j)$ is defined by $$G_x(i,j)=I(i+1,j)-I(i-1,j)$$

and $G_y$ is defined by $$G_y(i-j)=I(i,j+1)-I(i,j-1)$$

The gradient magnitude $\|G(i,j)\|$ at pixel (i,j) is $$\|G(i,j)\|=\sqrt{[G_y^2(i,j)+G_y^2(i,j)]}$$

The gradient activity per unit area is defined as $$\overline{G(i,j)} = \left\{ \frac{\sum_{k=1}^{k=M}\sum_{l=1}^{l=N} \|G(k,1)\|}{MN} \right\}$$

where the sums are calculated over a rectangular window of size M×N pixels such that pixel (i,j) is at the center of the this area. The shape of the window is not important, and any other window shape could have been chosen such as circular.

Instead of the gradient magnitude $\|G\|$, one could also use the sum of the absolute values of the x and y gradients $|G_x|+|G_y|$, or simply a Boolean variable B, defined as follows:

$$B = \begin{array}{l} 1 \text{ if } G_x \neq 0 \text{ or } G_y \neq 0 \\ 0 \text{ if } G_x = 0 \text{ and } G_y = 0 \end{array}$$

Figure 4:
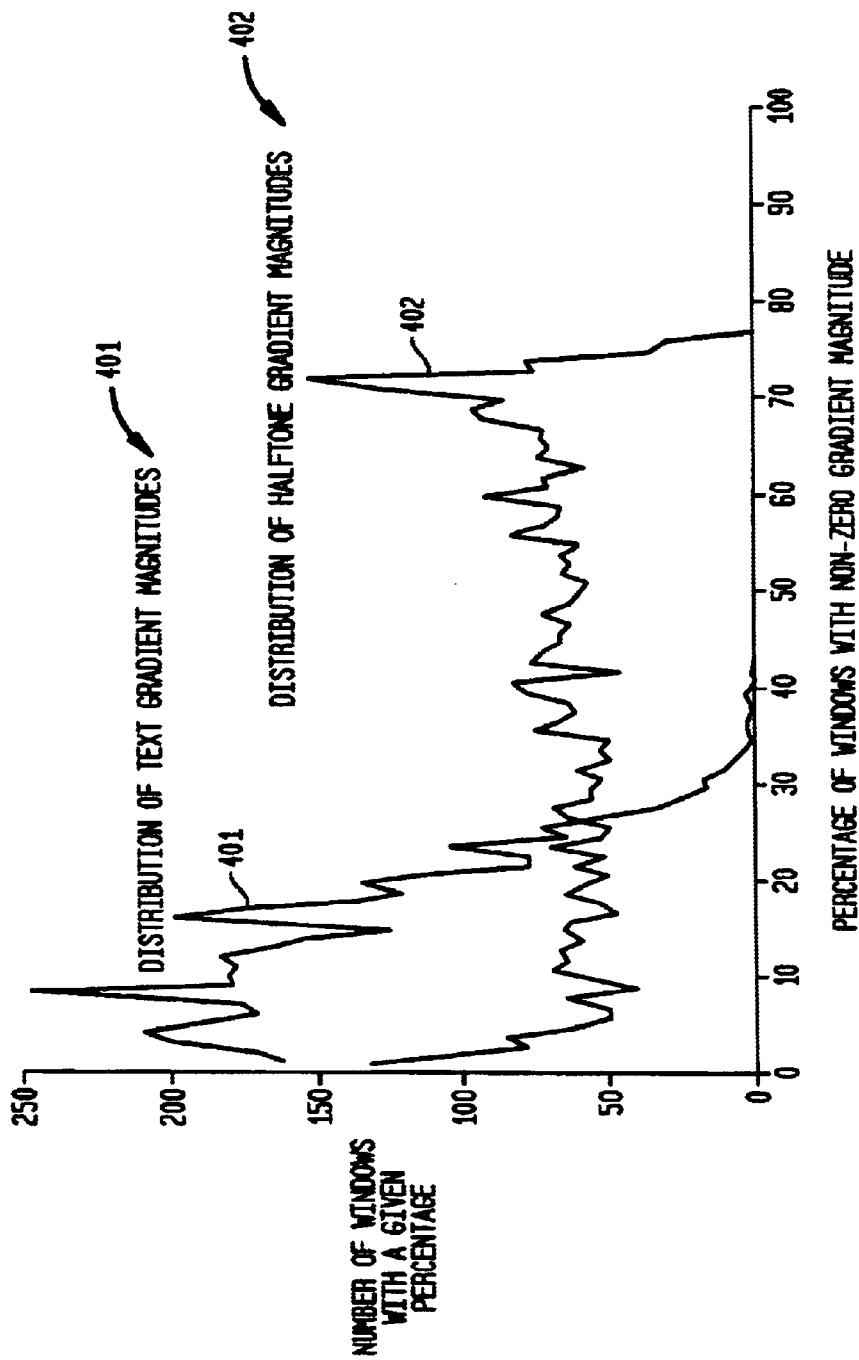
FIG. 4 is a plot of the distribution of gradient activity for text v. halftone regions of a binary image.

These alternate measures of gradient activity are approximations to the gradient norm, which lend themselves to fast implementation as we do not have to compute the square root of the sums of squares. The preferred embodiment uses the Boolean variable B as a measure of gradient activity. It is expected that the gradient activity per unit area 303 will be high in halftone areas and low in the text areas. This observation is born out in practice as shown in FIG. 4, which is a plot of the distribution of gradient activity for text vs. halftone areas. The plots are histograms of non-zero gradient magnitude for text and halftone areas. A window size of 25×25 was used to calculate the gradient activity per unit area. FIG. 4 shows that the distribution of gradient activity for text 401 and halftone 402 regions are clearly different, and it is virtually impossible to find text regions which have a gradient activity of more than 50%. Whereas, there are a significant number of halftone pixels which have a gradient activity of more than 50%.

Thus, a simple rule to segment text from image halftone areas is:

If gradient-activity>gradient-threshold pixel is image halftone else pixel is text In the preferred embodiment, the size of the window used is M=25, N=25. These are adjustable parameters. The gradient threshold employed in the above rule is 50%, and is also adjustable. Note that the performance of the algorithm is not crucially dependent on the choice of this threshold. Any percentage that is reasonably high will do.

In the preferred embodiment a segmentation decision is made every $K=15^{th}$ pixel. Note that the choice of K is not crucial, and any value of K>1 will generate computational savings.

Clustering of Initially Segmented Pixels

The result of performing the clustering operation is a completely segmented image, where every pixel of the original image is assigned a "1" if it belongs to a halftone area or a "0" if it belongs to a text area.

The preferred clustering technique results in rectangular bounding boxes being drawn around the image areas 305, which are the results of the initial segmentation. It is assumed that the halftone image areas 305 are rectangular in shape, which is usually true. However, other circumscribing boundaries can be used, such as convex hulls (to be found in R. Sedgewick, *Algorithms*. Addison Wesley, 1983, London).

The well known union-find algorithm is used in order to perform clustering 306 (to be found in R. Sedgewich, *Algorithms*. Addison Wesley, 1983, London). The algorithm takes as input a set of points in a graph, and connects each pair of points that satisfy some clustering criterion. In the present case, two points are said to belong to the same cluster if they are less than some minimum distance apart. For instance, one can set the clustering criterion to be 100 pixels, so that any two points will belong to the same cluster if and only if they are within 100 pixels of each other.

The distance measure used is the city-block distance due to its computational efficiency. Other distance measures could be used such as Euclidean distance measure, but these involve more computations. The city-block distance, D, between two pixels located at (i,j) and (m,n) is defined as $$D(i,j,m,n)=|i-m|+|j-n|$$

Each cluster found is assigned a rectangular bounding box 307 where the bounding box is defined to be the smallest rectangle that contains all the points in the cluster. The first round of clustering operations results in a set of bounding boxes that may overlap each other. The reason for the overlap is that the original clustering criterion uses the distance between pixels, and not distance between bounding boxes.

Hence we perform a second round of clustering 308, where two bounding boxes are merged if they overlap. The final result of these two clustering operations is a set of bounding boxes 309, where every pixel inside a given bounding box belongs to a halftone area, and every pixel outside the bounding box belongs to a non-halftone area, such as text.

It is noted that an alternate approach would be to perform binary connected component analysis (as described in D. H. Ballard and C. M. Brown, *Computer Vision*. Prentice Hall, 1982) on the initially segmented image, and then perform a single clustering operation. In the illustrative embodiment described herein, a clustering operation is performed instead of a binary connected component analysis as clustering is computationally more efficient.

Now that the original bi-level image is segmented into halftone and non-halftone areas, the method proceeds to re-halftone areas as follows.

Detection of Periodicity

A distinction is made between two types of halftones: those that contain screens, such as a 45° screen used in printing gray scale images, and those that do not contain screens, such as those created by error diffusion techniques. The re-halftoning of screened halftones is more problematic as there is a danger that Moire patterns may be introduced if the frequency of the re-halftoning process does not match the original screen frequency. However, such a danger does not exist in the case of screenless halftones such as those created by error diffusion. Hence, we focus most of our attention on detecting the presence of a screened halftone, and identifying the periodicity of the halftone.

Several methods for detecting periodicity were investigated such as autocorrelation and using "exclusive-or" operations. The autocorrelation method can be used but is not favored as it is computationally expensive, involving the shifting, multiplying and summing of a sequence with itself. Also, several rows or columns need to be analyzed since it is quite possible that a single row or column may not exhibit an easily detectable periodicity. A related method is to substitute the exclusive-or operation for the multiplication and summing operations, and to count the number of zero bytes instead of the number of bits. Counting by bytes is faster. However, this method is still computationally expensive compared to the preferred method described below, which is called "shift and accumulate".

Shift and Accumulate

Figure 5:
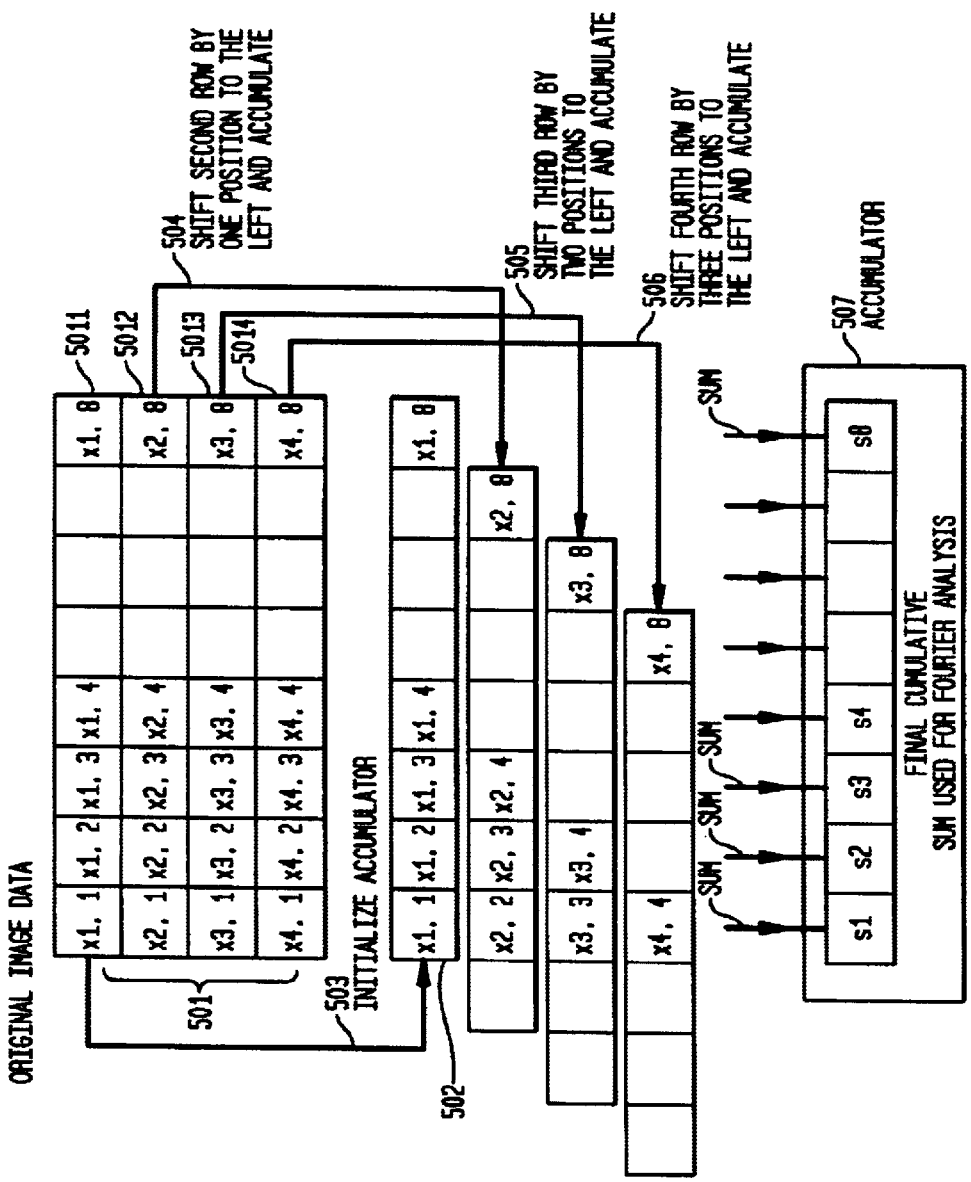
FIG. 5 is an illustration of data arrays for illustrating the shift and accumulate process of the present invention.
Figure 6:
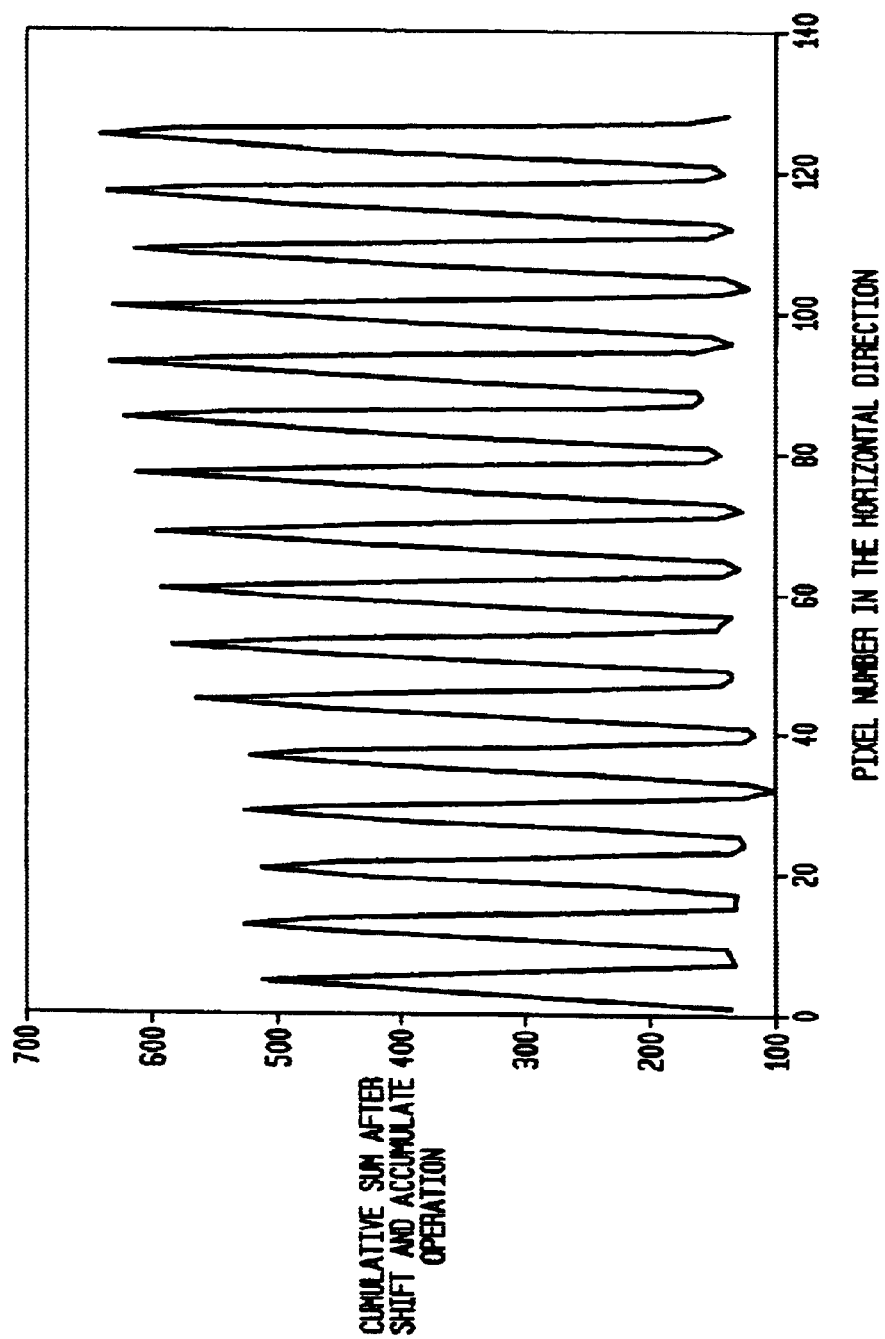
FIG. 6 is a plot of a typical sequence resulting from the shift and accumulate method of the present invention.

This method is illustrated in FIG. 5. The procedure will be described for detecting periodicity in the horizontal direction, across columns, without loss of generality. The procedure is the same for the vertical direction, along rows. The starting point is an accumulator array 507, which is initialized 503 to the first row 5011. The second row 5012 is shifted by one pixel to the left and added to the accumulator. The third row 5013 is shifted two pixels to the left and added to the accumulator, and so on. By the time the entire image is traversed, the accumulator array 507 contains the accumulated sum of shifted projections. This accumulated array is a one dimensional representation of the entire image, which amplifies any periodicity present in the original image. Periodic components reinforce each other in the final accumulated sum. FIG. 6 is a plot of a typical sequence resulting from the operation of the shift and accumulate method. The original sequence contained 1984 points, out of which the first 128 points are plotted for the sake of clarity. Note the strongly periodic nature of the plot.

Note that the shift-and-accumulate method of the present invention works best with a 45° halftone screen. However, it can be easily adapted to other screen angles by shifting every $M^{th}$ row by N pixels such that the screen angle equals $\tan^{-1}(N/M)$.

The constructing method of a gray scale representation includes utilizing the estimate of the primary periodicity to construct a gray scale image that does not contain periodic content at the periodicity of the estimate of the primary periodicity.

The construction of a gray scale image further includes creating a filter with a spectral zero at the frequency corresponding to the estimate of the primary periodicity and applying the filter to the pixels in the halftone areas.

First Order Differencing

Figure 7:
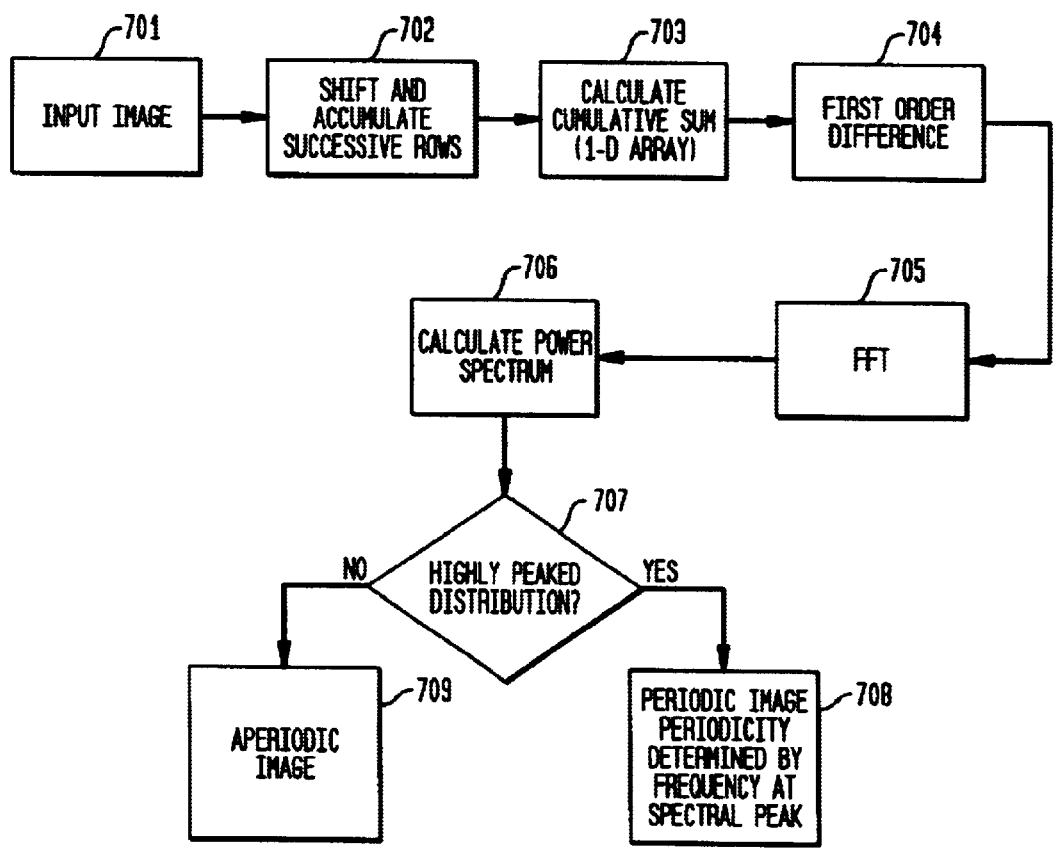
FIG. 7 is a block diagram illustrating the periodicity detection process of the present invention.

FIG. 7 shows the subsequent stages of processing the image to detect periodicity. The input image 701 is processed by the shift and accumulate method 702 and the cumulative sum is calculated at 703.

The accumulated sum is denoted by a sequence s. In the language of time series analysis (as described in W. Vandaele, *Applied time series and Box-Jenkins models*. New York: Academic Press, 1983), s typically contains trends which may mask the periodicity that we wish to isolate. Thus a first order differencing operation is performed at 704 as customary in time series analysis to remove trends. This results in a new sequence $s_2$ where the $i^{th}$ element of $s_2$ is $$s_2(i)=s(i+1)-s(i)$$

In other words, the method differentiates the original sequence s. In order to suppress the well documented noise amplification characteristics of the differentiation operator (as described in A. N. Tikhonov and V. Y. Arsenin, *Solutions of Ill-Posed Problems*, V. H. Winston & Sons, 1977), first s is smoothed by a Gaussian filter with a small kernel size, such as size 5. In the preferred embodiment the coefficients used are {1, 64, 256, 64, 1}, however, any set of smoothing coefficients can be used.

The next step is to take the Fourier Transform of $s_2$ using an FFT implementation at 705 (such as the one described in W. H. Press, B. P. Flannery, S. A. Teukolsky, and W. T. Vetterling, *Numerical Recipes in C: The Art of Scientific Computing*. Cambridge University Press 1988.) In the following equation $S_2$ represents the FFT of the sequence $s_2$, and $S_{2n}$ represents the $n^{th}$ element of the FFT.

$$S_{2n} = \sum_{k=0}^{k=N-1} S_{2k} e^{2\Pi ikn/N}$$

where N is the length of the sequence. Thus the original sequence is mapped into a set of complex numbers according to the above equation. The power spectrum P is defined to be a sequence of length N where the $k^{th}$ element is $$P_k = S_{2k} \times S^*_{2k}$$

where the * operation denotes complex conjugation. The power spectrum calculated at 706 depicts the distribution of spectral energy content at different frequencies. In the time series literature, the power spectrum is also known as the periodogram (as described in W. Vandaele, *Applied time series and Box-Jenkins models*. New York: Academic Press, 1983). At decision block 707 a determination is made if there is a highly peaked distribution. In doing this, the dominant peak in the power spectrum is identified easily as the maximum value in the sequence P. In order to test for periodicity, the height of the second peak is calculated and the ratio between the first and second peaks is found. If the ratio is high, for example>3, the original sequence is deemed to be periodic, and the period is determined by the location of the first peak at 708. If the ratio is low, it means the spectral energy is distributed more or less equally, implying the original sequence is aperiodic or in other words does not contain dominant periodic function at 709. Other tests of periodicity are possible, and may be used just as well (as described in L. G. Tatum, "Control charts for the detection of a periodic component," Technometrics, no. 2, pp. 152–60, May 1996).

Figure 8:
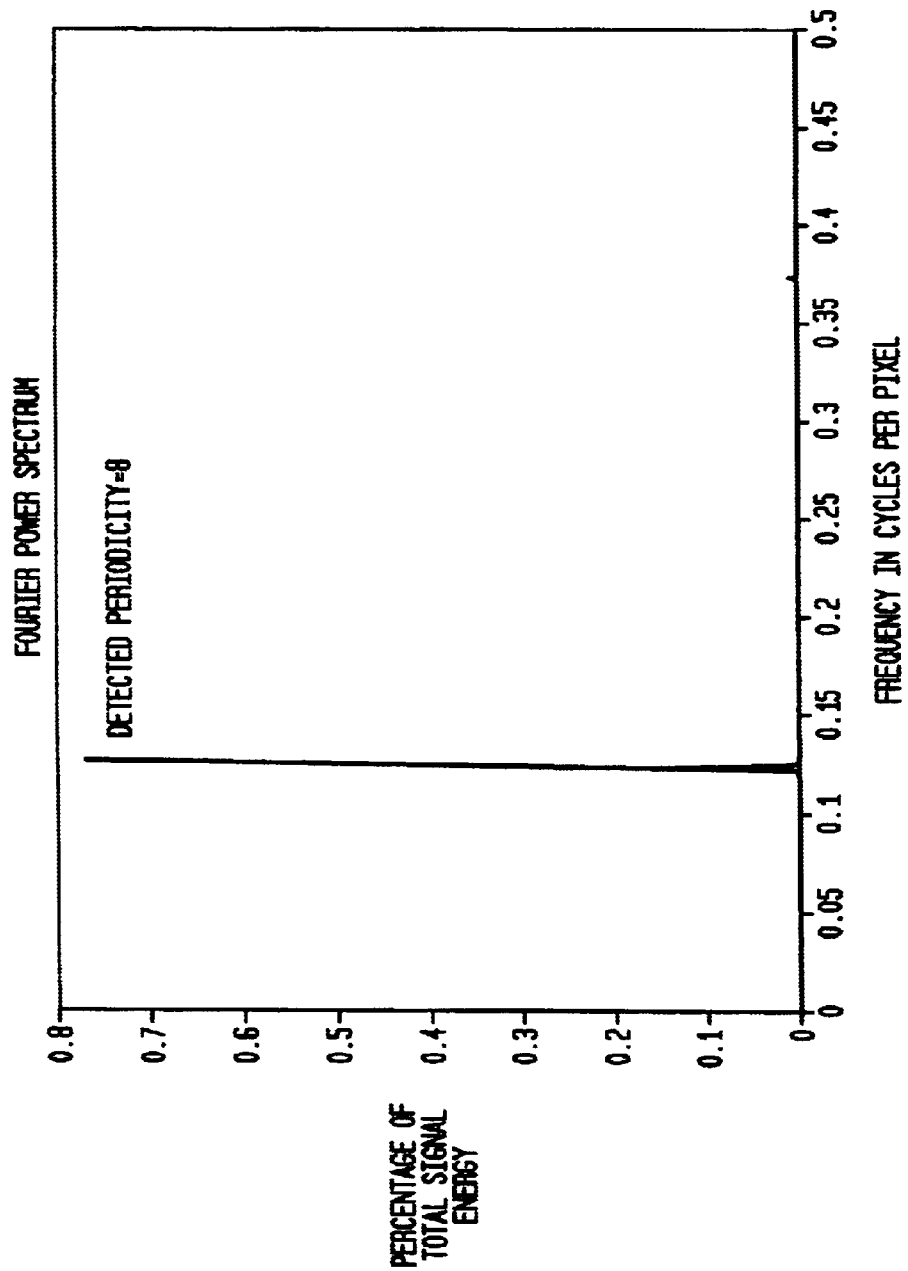
FIG. 8 is a plot of a Fourier power spectrum of the sequence of FIG. 6.

FIG. 8 shows the output of the periodicity detector of the present invention. The Fourier power spectrum is shown of the sequence of FIG. 6 after smoothing and first order differencing.

Two Dimensional FFT

It is also possible to perform a two dimensional Fast Fourier Transform (FFT) across the whole image. But the image size can be large (e.g. 6000×6000 pixels), and the computation of the 2D FFT is much more expensive than the above computation of the first order differencing.

Generation of an Intermediate Gray Level Image

Taking the horizontal and vertical periodicity detected in the previous step, the next step is to create an M×N smoothing box filter, where M is half the vertical period and N the horizontal period. In another embodiment, an M×N smoothing box filter is used where M is equal to the vertical period and N is equal to the horizontal period. This smoothing filter is moved across the input image (each of the areas of the original image that is deemed to be a periodic halftone area) to generate an intermediate gray level image. The center of the M×N box is assigned the smoothed value. This process is illustrated in FIGS. 9 and 10.

Figure 9:
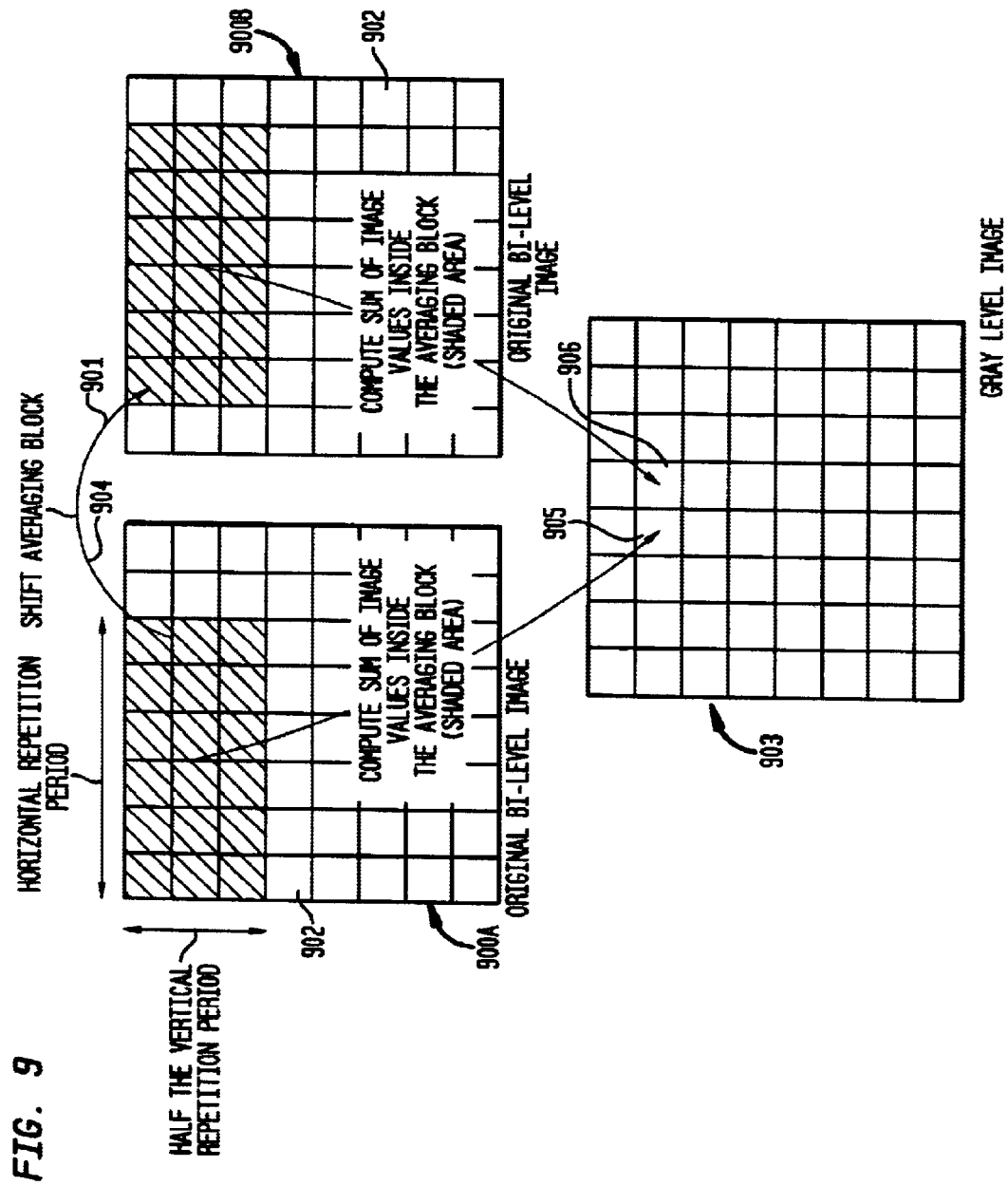
FIGS. 9 and 10 are pixel image maps for illustrating the method constructing an intermediate gray scale image of the present invention.
Figure 10:
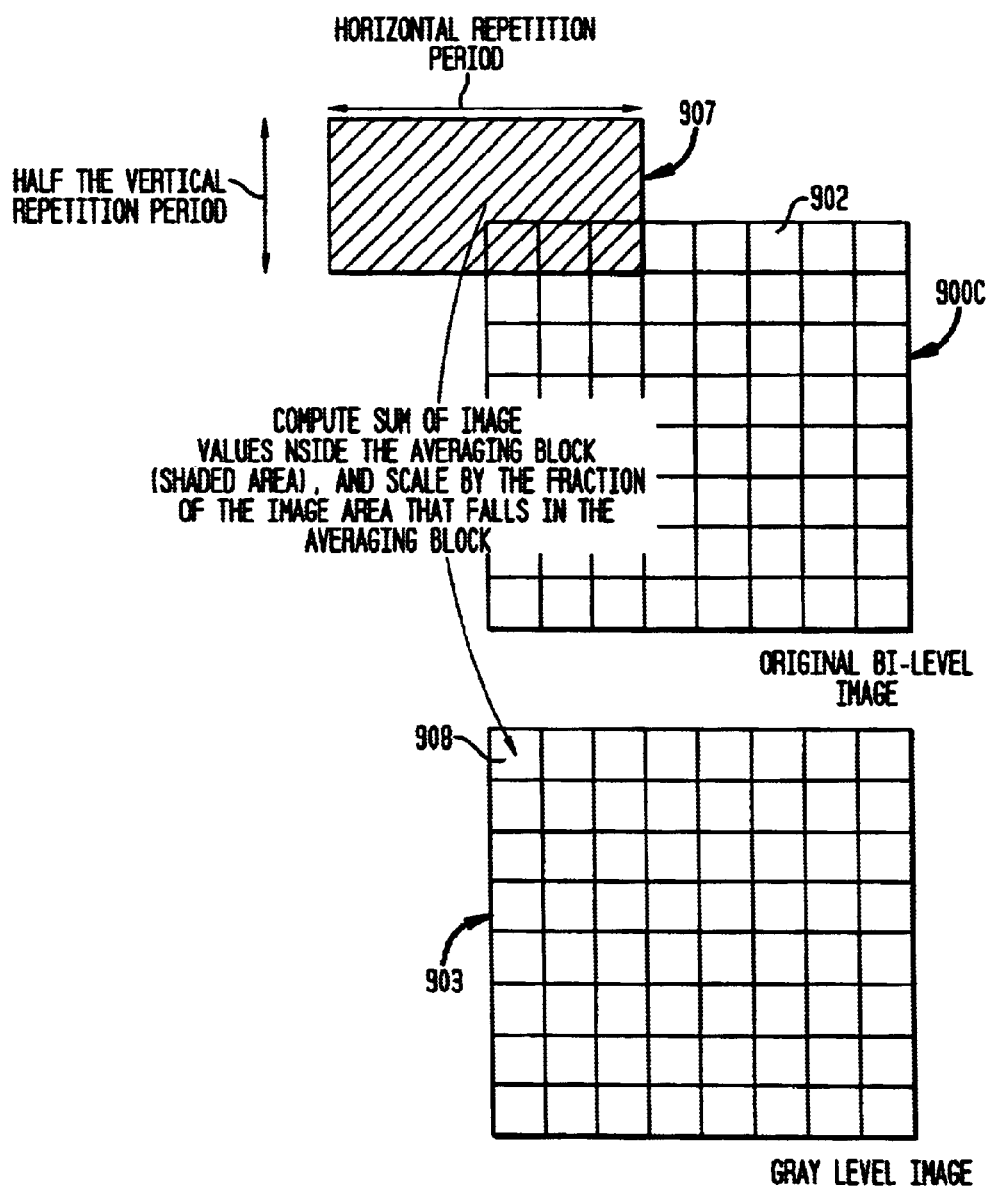

FIG. 9 shows an example when the smoothing filter is contained entirely within the input image. Both images 900A and 900B represent the original bi-level input image, with each of the square areas 902 representing individual pixels each having an image value. In this example, the box filter is a 3×6 pixel filter. For illustrative purposes, the image is only a 8×8 image, but it is well known that actual images will have many more pixels, such as 1024×1024. FIG. 9 shows how groups of 3×6 pixels are averaged to form a single value for a pixel in the intermediate gray level image 903. In image 900A, group 904 are averaged and the averaged value is assigned to pixel 905 in image 903. The box filter is shifted one pixel as shown in image 900B and the average value of group 901 is assigned to pixel 906 in image 903. The box filter is shifted until all 64 pixels in image 903 are assigned values. In order to fill all the pixels of the intermediate gray scale image, the box filter will sometimes lie only partially within the input image. FIG. 10 is an example of this case. Box filter 907 only covers three pixels of input image 900C. The value for pixel 908 of image 903 is computed by taking the sum of the image values inside the averaging block 907 and scale by the fraction of the image area that falls in the averaging block.

In the preferred embodiment, all the coefficients within the M×N box filter are set to "1". However, other assignments are also possible, such as a Gaussian kernel. Any set of filter coefficients that is low-pass will perform comparably.

It is important to note that the intermediate gray level image does not contain any halftone screen since the periodic information of the screen is used to design the appropriate descreening filter.

Rehalftoning

This intermediate gray level image is then rehalftoned using any desired halftone technique. For instance, one can use a dither matrix as illustrated in FIG. 11.

Figure 11:
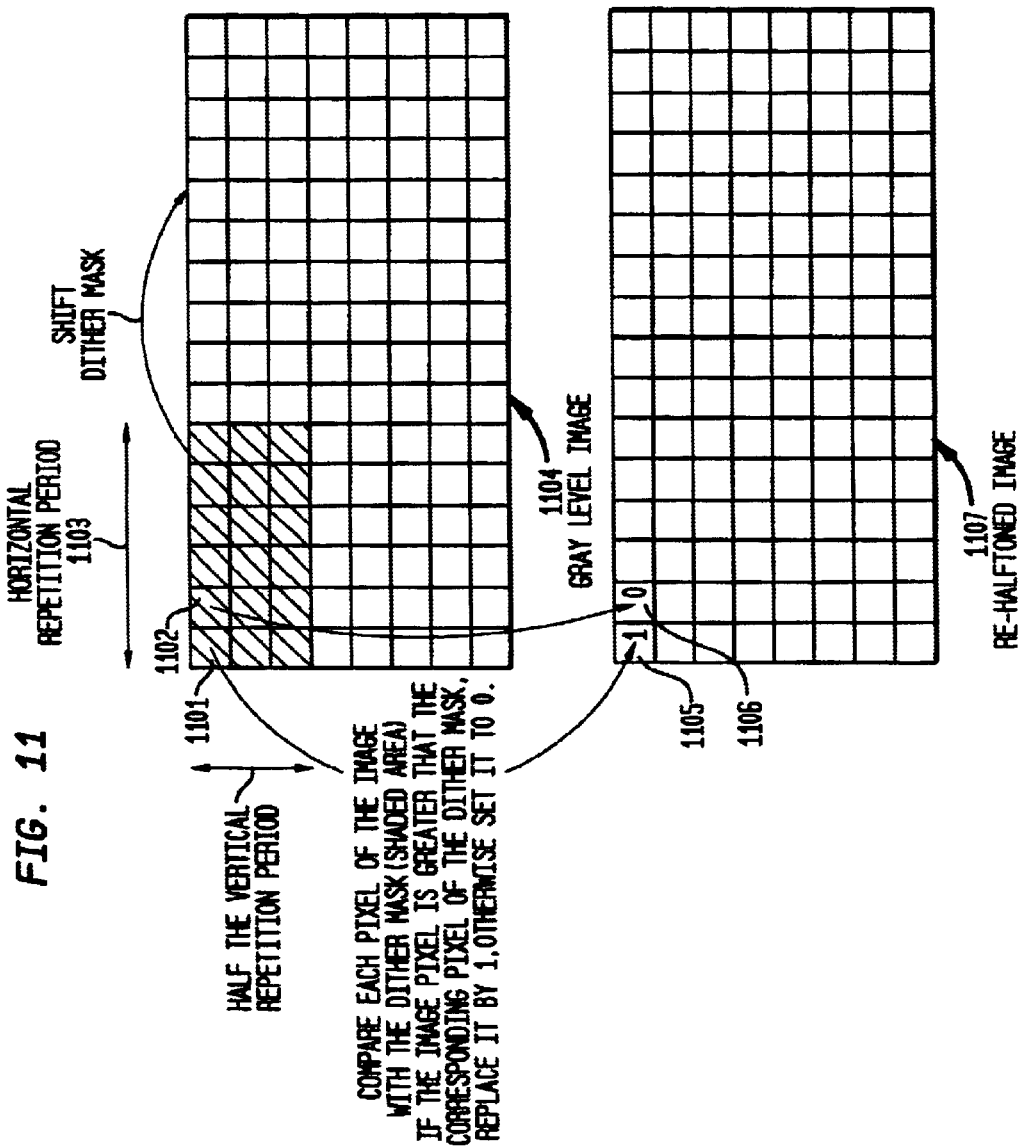
FIG. 11 is a pixel image map illustrating the rehalftoning method of the present invention.

FIG. 11 illustrates the process of halftoning by using a dither mask.

The dither mask 1103, is of size M×N where M, the number of rows, is half the vertical repetition period and N, the number of columns, is the horizontal repetition period.

The input gray level image 1104 is shown to be of size 8×16 though other sizes can just as well occur.

The pixel of the gray level image at location 1101 is compared with the corresponding dither mask pixel, and in this case, happens to be greater than the dither mask pixel. Hence, a "1" is placed at location 1105 in the output re-halftoned image. Location 1105 in the output re-halftoned image is the same as location 1101 in the input gray level image.

Similarly, the pixel of the gray level image at location 1102 is compared with the corresponding dither mask pixel, and in this case, happens to be less than the dither mask pixel. Hence, a "0" is placed at location 1106 in the output re-halftoned image. Location 1106 in the output re-halftoned image is the same as location 1102 in the input gray level image.

The dither mask 1003 is shifted by N pixels in the horizontal direction, and the entire comparison process is repeated till the boundary of the gray level image is reached.

Then the dither mask 1003 is moved down by M pixels and over by N/2 pixels, and the above procedure is repeated. A circular overlap of the dither matrix is assumed to ensure that the entire input image is processed.

The important point to note is that since the intermediate gray level image has been properly generated, there are no Moire patterns during the rehalftoning process.

During this rehalftoning process, use can be made of the printer characterization parameters of the second printer in order to make the printer halftoned image match the output of the first printer. This is how similarity is achieved between the two printed outputs.

During the rehalftoning process, one can use a calibrated dither matrix to ensure accurate tonal reproduction. Any halftone process can be used at this stage, such as dither matrices of smaller size (which generate finer line screens), or error diffusion.

In addition, one can employ image enhancement techniques such as sharpening and contrast improvement on the intermediate gray level image, prior to rehalftoning.

Combining

Finally, the rehalftoned areas are combined with the areas that were not processed (i.e. non-halftone areas such as text) in order to generate a complex image.

The method may be implemented in any means and manner to provide the concepts and advantages of the invention. This includes implementation as a computer program product, and a program storage device readable by machine.

While the invention has been particularly shown and described with respect to a preferred embodiment thereof, it will be understood by those skilled in the art that the foregoing and other changes in form and details may be made therein without departing from the spirit and scope of the invention.

What is claimed is:

1. A method for repurposing a bi-level image, comprised of an array of pixels, each pixel having one of two values, said method comprising:
    (a) for each of at least selected ones of the pixels, identifying an area of the array around the pixel, determining gradient density activity in said area by determining the number of changes in pixel intensity values, per unit area, in said identified area, and segmenting the bi-level image into halftone area, with or without text, and non-halftone areas;
    (b) rehalftoning the halftone areas; and
    (c) combining the rehalftoned areas with the non-halftoned areas to form a repurposed image.

2. The method of claim 1 wherein step (a) includes classifying pixels of the bi-level image as halftone and non-halftone pixels based on a distribution of gradient information.

3. The method of claim 2 wherein the distribution of gradient information is determined by measuring a gradient activity per unit area of the bi-level image.

4. The method of claim 1 wherein step (a) includes clustering pixels of the bi-level image into clusters of halftone pixels and clusters of non-halftone pixels.

5. The method of claim 2 wherein step (a) includes further classifying the pixels into clusters of halftone pixels and clusters of non-halftone pixels.

6. An article of manufacture comprising a computer usable medium having computer readable program code means embodied therein for repurposing a bi-level image comprised of an array of pixels, each pixel having one of two values, the computer readable program code means in said article of manufacture comprising computer readable program code means for causing a computer to effect the following steps:
    (a) for each of at least selected ones of the pixels, identifying an area of the array around the pixel, determining gradient density activity in said area by determining the number of changes in pixel intensity values, per unit area, in said identified area, and segmenting the bi- image into halftone areas, with or without text, and non-halftone areas;
    (b) rehalftoning the halftone areas; and
    (c) combining the rehalftoned areas with the non-halftoned areas to form a repurposed image.

7. An article of manufacture as recited in claim 6, wherein step (a) includes classifying pixels of the bi-level image as halftone and non-halftone pixels based on a distribution of gradient information.

8. An article of manufacture as recited in claim 7, wherein the distribution of gradient information is determined by measuring a gradient activity per unit area of the bi-level image.

9. An article of manufacture as recited in claim 6, wherein step (a) includes clustering pixels of the bi-level image into clusters of halftone pixels and clusters of non-halftone pixels.

10. An article of manufacture as recited in claim 7, wherein step (a) includes further classifying the pixels into clusters of halftone pixels and clusters of non-halftone pixels.

11. A computer program product comprising a computer usable medium having computer readable program code means embodied therein for repurposing a bi-level image comprised of an array of pixels, each pixel having one of two values, the computer readable program code means in said computer program product comprising computer readable program code means for causing a computer to effect:
    (a) for each of at least selected ones of the pixels, identifying an area of the array around the pixel, determining gradient density activity in said area by determining the number of changes in pixel intensity values, per unit area, in said identified area, and segmenting the bi-level image into halftone areas, with or without text, and non-halftone areas;
    (b) rehalftoning the halftone areas; and
    (c) combining the rehalftoned areas with the non-halftoned areas to form a repurposed image.

12. A computer program product as recited in claim 11, wherein step (a) includes classifying pixels of the bi-level image as halftone and non-halftone pixels based on a distribution of gradient information.

13. A program storage device readable by machine, tangibly embodying a program of instructions executable by the machine to perform method steps for repurposing a bi-level image comprised of an array of pixels, each pixel having one of two values, said method steps comprising:
    (a) for each of at least selected ones of the pixels, identifying an area of the array around the pixel, determining gradient density activity in said area by determining the number of changes in pixel intensity values, per unit area, in said identified area, and segmenting the bi-level image into halftone areas, with or without text, and non-halftone areas;
    (b) rehalftoning the halftone areas; and (c) combining the rehalftoned areas with the non-halftoned areas to form a repurposed image.

14. A method of segmenting a bi-level image into halftone areas, with or without text, and non-halftone areas, said image being comprised of an array of pixels, each pixel having one of two values, said method comprising:

for each of at least selected ones of the pixels, identifying an area of the array around the pixel, determining gradient density activity in said area by determining the number of changes in pixel intensity values, per unit area, in said identified area, , and classifying pixels of the bi-level image as halftone and non-halftone pixels based on said determined gradient density.

15. The method of claim 14, wherein the distribution of gradient information is determined by measuring a gradient activity per unit area of the bi-level image.

16. The method of claim 15, further comprising the step of clustering pixels of the bi-level image into clusters of halftone pixels and clusters of non-halftone pixels.

17. The method of claim 16, further comprising the step of classifying the pixels into clusters of halftone pixels and clusters of non-halftone pixels.

18. A program storage device readable by machine, tangibly embodying a program of instructions executable by the machine to perform method steps for segmenting a bi-level image into halftone areas, with or without text, and non-halftone areas, said image being comprised of an array of pixels, each pixel having one of two values, said method steps comprising for each of at least selected ones of the pixels, identifying an area of the array around the pixel, determining gradient density activity in said area by determining the number of changes in pixel intensity values, per unit area, in said identified area, and classifying pixels of the bi-level image as halftone and non-halftone pixels based on said determined gradient density.

19. A program storage device readable by machine as recited in claim 18, wherein the distribution of gradient information is determined by measuring a gradient activity per unit area of the bi-level image.

20. A program storage device readable by machine as recited in claim 19, said method steps further comprising the step of clustering pixels of the bi-level image into clusters of halftone pixels and clusters of non-halftone pixels.

21. A program storage device readable by machine as recited in claim 20, said method steps further comprising the step of classifying the pixels into clusters of halftone pixels and clusters of non-halftone pixels.

* * * * *

UNITED STATES PATENT AND TRADEMARK OFFICE
CERTIFICATE OF CORRECTION

PATENT NO. : 6,633,411 B1
DATED : October 14, 2003
INVENTOR(S) : Ravishankar Rao et al.

It is certified that error appears in the above-identified patent and that said Letters Patent is hereby corrected as shown below:

<u>Column 10,</u>
Line 12, "bi-image" should read -- bi-level image --

Signed and Sealed this

Twenty-fourth Day of February, 2004

JON W. DUDAS
*Acting Director of the United States Patent and Trademark Office*